R. C. HOFFMAN.
DISK WHEEL FOR VEHICLES.
APPLICATION FILED JUNE 12, 1920.
1,376,938.
Patented May 3, 1921.
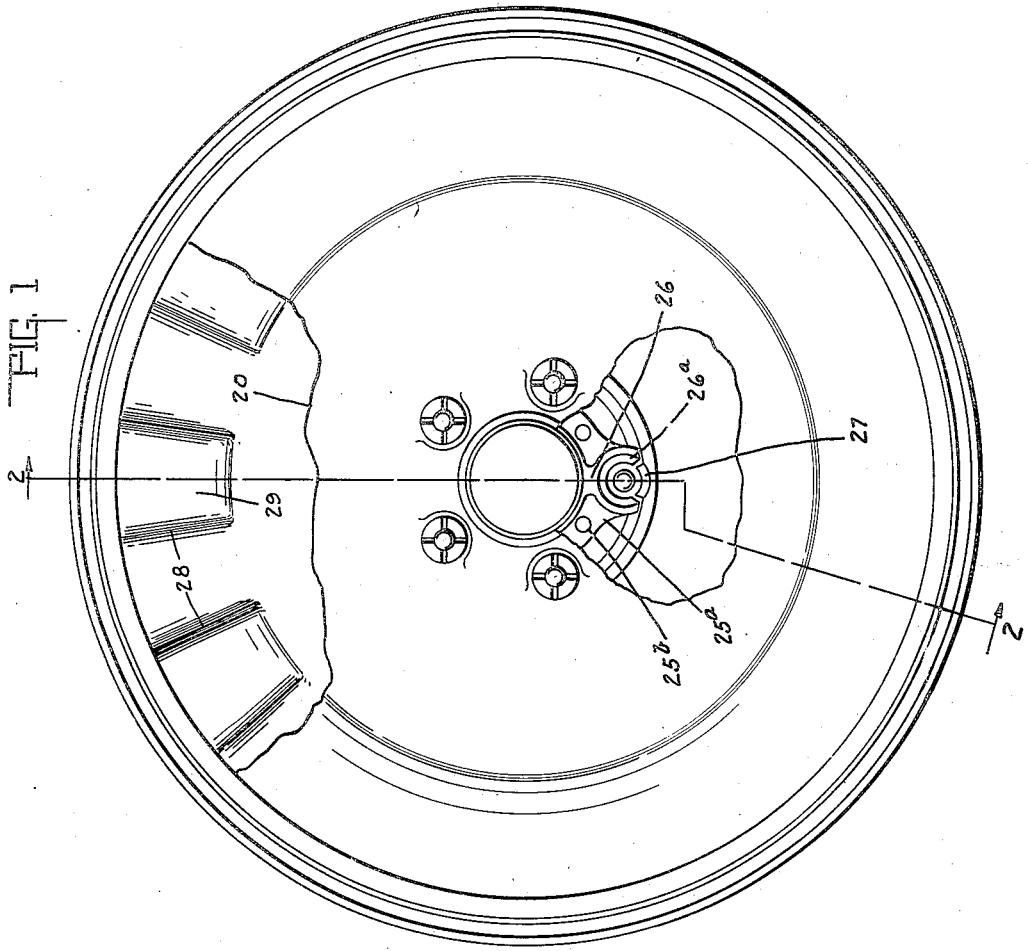
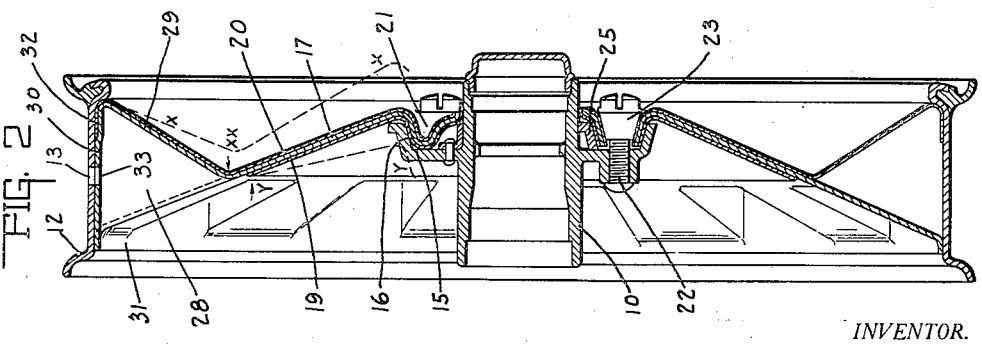
INVENTOR.
ROSCOE C. HOFFMAN.
BY
*Lockwood & Lockwood*
ATTORNEYS.

UNITED STATES PATENT OFFICE.

ROSCOE C. HOFFMAN, OF HAMMOND, INDIANA.

DISK WHEEL FOR VEHICLES.

1,376,938.  Specification of Letters Patent.  Patented May 3, 1921.

Application filed June 12, 1920. Serial No. 388,543.

*To all whom it may concern:*

Be it known that I, ROSCOE C. HOFFMAN, a citizen of the United States, and a resident of Hammond, county of Lake, and State of Indiana, have invented a certain new and useful Disk Wheel for Vehicles; and I do hereby declare that the following is a full, clear, and exact description thereof, reference being had to the accompanying drawings, in which like numerals refer to like parts.

This invention relates to a disk wheel for vehicles, and particularly to the construction of the supporting means between the wheel rim and the wheel hub.

The chief object of this invention is to provide a disk wheel with improved intermediate means between the wheel felly and the hub, whereby the former is supported upon the latter such that road shocks received by the felly are transmitted and distributed equally therearound to the axle supporting said hub and the load carried by said wheel, whether in compression or suspension.

The chief feature of the invention consists in providing suitable fluting intermediate the felly and the hub, whereby maximum strength is secured between said felly and said hub.

A further feature of the invention consists in providing auxiliary reinforcing disks which increase the resiliency of the wheel as well as reinforce the same.

Another feature of the invention consists in extending one of said reinforcing disks outwardly adjacent the fluting to cover the same whereby the outside of the wheel will appear to be of the usual disk construction.

A further feature of the invention consists in positioning said intermediate supporting means between the wheel felly and the hub such that no part of the same projects beyond the width of the wheel felly.

The full nature of the invention will be understood from the accompanying drawings and the following description and claims.

In the drawings Figure 1 is a front elevational view of the wheel felly, intermediate means and hub with the hub cap removed and a portion of the intermediate means and the hub supporting portion broken away to show other parts in detail.

Fig. 2 is a central cross sectional view taken on the broken line 2—2 of Fig. 1 and in the direction of the arrows.

In the drawings there is shown a vehicle wheel of the disk type. In Fig. 2, 10 indicates a hub of a disk wheel provided with a circumferentially extending flange 15 intermediate the ends thereof and having an upwardly extending annular beveled rim 16 in which the intermediate means between the hub and the wheel felly is secured. The disk wheel is composed of a sheet metal disk 17, yieldingly reinforced by the spring disks 19 and 20 positioned upon opposite sides of the main supporting disk. The inner edge of the disk wheel, comprising the three adjacent disks 17, 19 and 20, is provided with a plurality of depressions 21 for securing said disks to the hub.

The hub collar 25 is adapted to fit snugly about the hub 10 and has a radial flange portion 25$^a$ adapted to be rigidly secured to the hub flange 15 by the rivets 25$^b$ or any other suitable means. At intervals about the periphery of the collar 25 there are radially projecting bosses 26, herein shown in the form of a yoke with encircling fingers 26$^a$ forming within the same a partially inclosing conical surface or tapered seat. The conical flange 15 of the hub is correspondingly tapered to form a complementary tapered bearing portion 27 adjacent the yoke 26, said tapered portion 26$^a$ and portion 27 forming an encircling tapered seat.

At suitable intervals adjacent the tapered seat and about the same are provided conical depressions 27$^a$ formed in the annular flange 21 of the disks so as to make a snug fit with the tapered conical seat hereinbefore described. Extending forwardly of the flange 15 and suitably secured thereto are a plurality of bolts 22. Each of said bolts is positioned within the tapered seat hereinbefore described and extends forwardly through the same and each bolt is adapted to receive a suitable nut, herein shown provided with tapered sides, so that the same when drawn tight will be snugly seated in the conical seat and depressions so as to secure the disks snugly and securely to the hub 10.

The outer edge of the main supporting disk 17 is provided with a plurality of flutes, each flute being formed integral with and from said disk. In the present instance each flute is formed of a radial wall 28 and angular lateral wall portions 29, said fluting being further provided with an annular circumferential wall portion 30 to form a pocket, as shown clearly in Fig. 2. The disk 17 extends from a plane through one side of the wheel rim at the hub portion, to the opposite side of the rim in a diagonal direction. The wall 29 of the pocket or fluting starts intermediate the diagonal portion and substantially intermediate the sides of the wheel rim and extends to the opposite adjacent side of the rim. The wheel rim 12 is secured to the annular circumferential portion or felly 31 of the disk 17 and the several pocket walls 30 in any suitable manner, preferably by being welded thereto.

The outside disk 20 extends from the hub to the rim and is positioned adjacent the disk 17 and extends around said pocket adjacent the wall 30. Said wall 30 is provided with a circumferential depression or groove to receive the inwardly turned edge 32 of the outer disk 20, said disk and said rim being secured together in any suitable manner, such as by welding and the like.

The reinforcing disk 20 after being secured to the pocket and the side wall 29, as described, is secured at the beginning of said pocket intermediate the rim 12 and the hub 10, said disk originally being positioned as shown by the dotted line XX in Fig. 2. When secured in the full line position, said disk directs a pressure in the direction of the arrow indicated XX. Similarly the reinforcing disk 19 is positioned adjacent and secured to the disk 17. The dotted line YY indicates the initial position of the disk 19, whereby an oppositely directed force is exerted at the point YY and in the direction of the arrow Y. The disks 17, 19 and 20 adjacent the groove 21 in the portions forming said groove are suitably secured together by welding and the like such that the same form one disk member.

With the foregoing construction it will be noted that the side walls 28 of the flutings or pockets are substantially radial. The annular portion or wall 30 thereof provides an increased bearing surface for the wheel rim 12 by which the latter is secured to the disk 17. The wheel rim 12 is provided with the usual valve stem opening 13, and one of said annular circumferential walls 30, forming part of the felly, is provided with a registering opening 33 such that the valve stem may project through the same and into one of said pockets in the usual manner.

It will also be noted that the plate 20 presents a continuous substantially V-shaped annular groove and prevents the accumulation of mud, snow, ice and the like in the pockets or flutings. It will be further noted that the flutings are formed and start from a point intermediate the hub and the felly portions of the disk and substantially intermediate the outer and inner edges of said hub and said felly. It will be further noted that no part of the disk construction extends beyond the plane of the wheel rims which provides that no part of the disk construction will be subjected to casual injury from curbing, walls or wheel ruts.

The invention claimed is:

1. A disk wheel construction comprising a wheel rim, a hub, means for supporting said hub within said rim, said means including a yielding spring metal disk portion secured to the hub, and a fluted portion formed integral with and about the periphery of said disk portion, said fluted portion being secured to and of substantially the width of the rim.

2. A disk wheel construction comprising a wheel rim, a hub, disk means supporting said hub within said rim, said disk means including a plurality of flutings, said flutings providing radially extending supporting portions about said rim, and pockets formed by said flutings, the annular circumferential wall of said pockets providing a felly supporting surface for said rim.

3. A disk wheel construction comprising a wheel rim, a hub, disk means mounted between said rim and said hub, said disk means including an integral disk member provided with a plurality of flutings forming pockets, the annular circumferential wall of each of said pockets forming a felly supporting surface for said rim of substantially the width thereof, and lateral walls formed by said pockets adapted to support and brace said disk member upon said rim.

4. A disk wheel construction comprising a wheel rim, a hub, means for supporting said hub within said rim, said means including a fluted disk of substantially the width of said rim, and a yielding reinforcing spring metal disk mounted on said hub adjacent said fluted disk for covering and protecting said fluted disk and adapted to exert a stress toward said fluted disk for reinforcing said wheel against lateral strain.

In witness whereof I have hereunto affixed my signature.

ROSCOE C. HOFFMAN.